(12) United States Patent  (10) Patent No.: US 7,072,467 B2
Ono  (45) Date of Patent: Jul. 4, 2006

(54) ELECTRONIC APPARATUS AND WATERPROOF STRUCTURE THEREFOR

(75) Inventor: Shuichi Ono, Tokyo (JP)

(73) Assignee: NEC Corporation, Tokyo (JP)

( * ) Notice: Subject to any disclaimer, the term of this patent is extended or adjusted under 35 U.S.C. 154(b) by 351 days.

(21) Appl. No.: 10/444,951

(22) Filed: May 27, 2003

(65) Prior Publication Data

US 2003/0223577 A1 Dec. 4, 2003

(30) Foreign Application Priority Data

May 28, 2002 (JP) ............................. 2002-153407

(51) Int. Cl.
*H04M 1/00* (2006.01)
(52) U.S. Cl. ......................... 379/433.01; 379/433.06; 379/433.07
(58) Field of Classification Search ................ 379/368, 379/433.06, 433.07, 433.01, 437, 441; 200/5 A
See application file for complete search history.

(56) References Cited

U.S. PATENT DOCUMENTS 3,854,018 A * 12/1974 Reynolds et al. ........... 200/5 A

FOREIGN PATENT DOCUMENTS

| EP | 0 444 914 A3 | 9/1991 |
|---|---|---|
| EP | 0 565 959 A1 | 10/1993 |
| GB | 2 256 969 A | 12/1992 |
| GB | 2 327 208 A | 1/1999 |
| JP | 2-53022 | 4/1990 |
| JP | 3-109090 | 11/1991 |
| JP | 3-126084 | 12/1991 |
| JP | 9-185101 | 7/1997 |
| JP | 10-21779 | 1/1998 |
| JP | 10-275536 | 10/1998 |
| JP | 2000-151772 | 5/2000 |
| JP | 2001-43768 | 2/2001 |
| JP | 2001-148726 | 5/2001 |

OTHER PUBLICATIONS

Copy of Great Britain Search Report dated Nov. 4, 2003.

* cited by examiner

*Primary Examiner*—Bing Q. Bui
(74) *Attorney, Agent, or Firm*—Dickstein, Shapiro, Morin & Oshinsky, LLP.

(57) ABSTRACT

A waterproof structure for an electronic apparatus of the present invention includes keybuttons positioned such that their ends appear via holes formed in the casing of the apparatus. A circuit board is loaded with switches configured to selectively open or close when the keybuttons associated therewith are operated. A sheet member is formed of an elastic material and intervenes between the keybuttons and the circuit board. The sheet member includes, at least in its peripheral portion thereof, a seal portion for preventing water or similar liquid from entering the apparatus and reaching the surface of the circuit board. When the sheet member is pressed between the casing and the circuit board, the seal portion is at least partly pressed against the inside surface of the casing while being subject to a bending load.

24 Claims, 12 Drawing Sheets

ELECTRONIC APPARATUS AND WATERPROOF STRUCTURE THEREFOR

BACKGROUND OF THE INVENTION

1. Field of the Invention

The present invention relates to a portable personal telephone or similar electronic apparatus and a waterproof structure for an operating section included in the same.

2. Description of the Background Art

Generally, a portable personal telephone or similar portable electronic apparatus is provided with a waterproof structure that prevents water or similar liquid and dust from entering a casing via clearances between the casing and keybuttons and corroding electric circuitry present in the casing. The conventional waterproof structure, however, cannot surely obviate the entry of water because the casing is apt to deform due to the influence of dimensional errors. Although the size of the casing may be increased to reduce the influence of dimensional errors, this kind of scheme is contrary to the increasing demand for a small-size portable electronic apparatus.

Technologies relating to the present invention are disclosed in, e.g., Japanese Utility Model Laid-Open Publication Nos. 2-53022, 3-109090 and 3-126084 and Japanese Patent Laid-Open Publication Nos. 9-185101, 2000-151772 and 2001-43768.

SUMMARY OF THE INVENTION

It is an object of the present invention to provide a waterproof structure for an electronic apparatus capable of hermetically sealing a casing without causing it to deform and suffering from a minimum of influence of dimensional errors, and an electronic apparatus including the same.

A waterproof structure for an electronic apparatus of the present invention includes keybuttons positioned such that their ends appear via holes formed in the casing of the apparatus. A circuit board is loaded with switches configured to selectively open or close when the keybuttons associated therewith are operated. A sheet member is formed of an elastic material and intervenes between the keybuttons and the circuit board. The sheet member includes, at least in its peripheral portion thereof, a seal portion for preventing water or similar liquid from entering the apparatus and reaching the surface of the circuit board. When the sheet member is pressed between the casing and the circuit board, the seal portion is at least partly pressed against the inside surface of the casing while being subject to a bending load.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
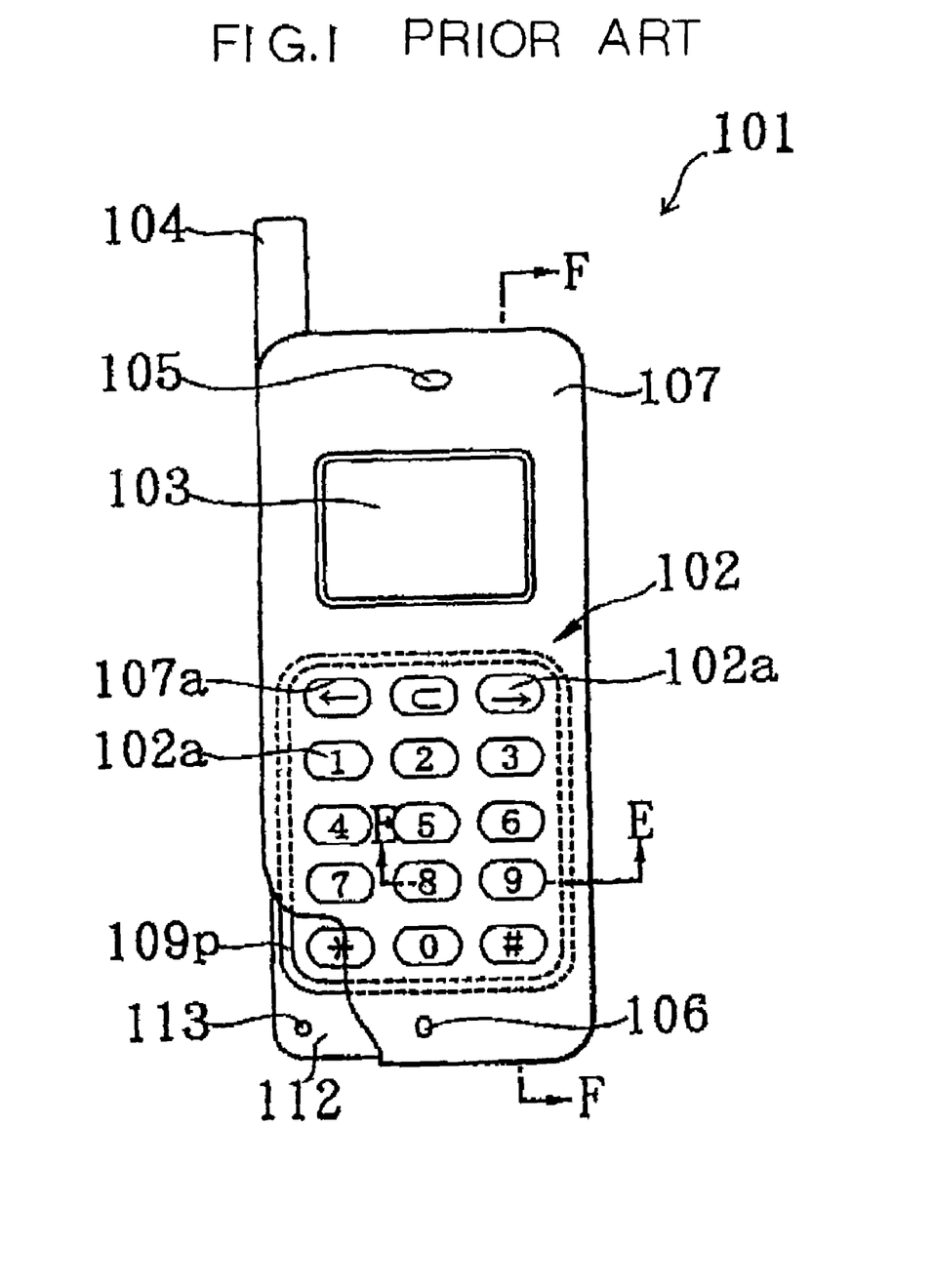
FIG. 1 is a front view showing a conventional electronic apparatus.
Figure 2:
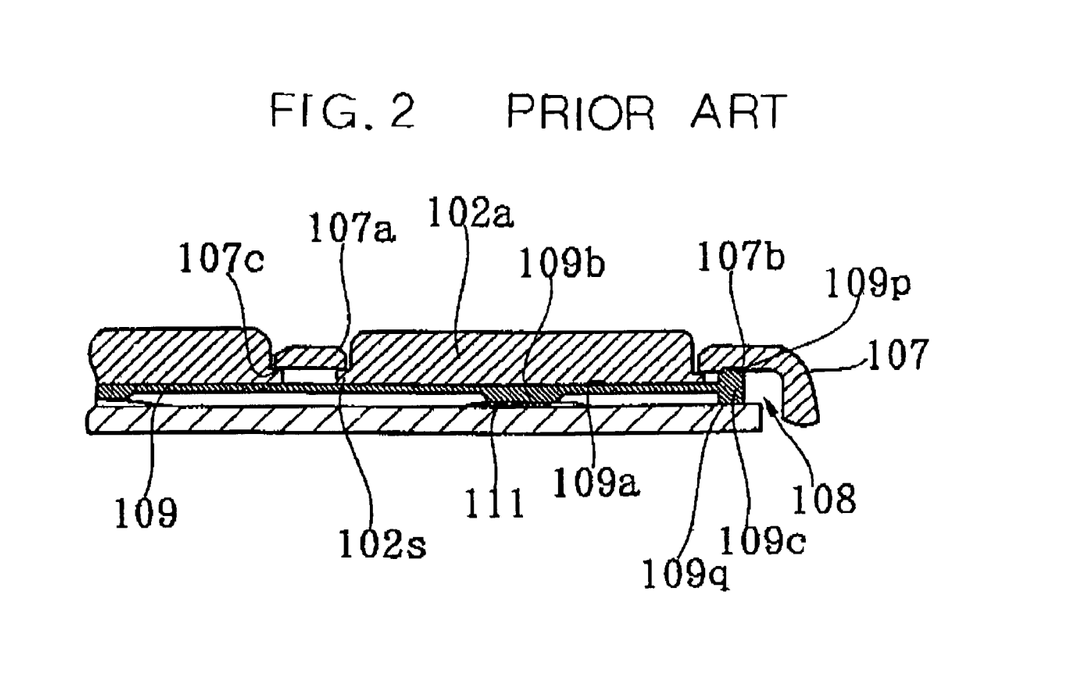
FIG. 2 is a section along line E—E of FIG. 1.

To better understand the present invention, reference will be made to a conventional portable personal telephone, shown in FIGS. 1 and 2. As shown, the telephone, generally 101, includes an operating section 102 on which a plurality of keybuttons 102a are arranged. The telephone 101 further includes a transmission type LCD (Liquid Crystal Display) or similar display 103, an antenna 104 for radio transmission and receipt, a speaker 105 for outputting a received speech, a microphone for inputting a speech to be sent, and a casing 107 formed with holes 107a through which the keybuttons 102a appear. A waterproof structure 108 is configured to prevent water or similar liquid from entering the casing 107 via clearances between the keybuttons 102a and the edges of the holes 107a.

The keybuttons 102a include ten-keys for inputting, e.g., numerals and a clear key that returns the operation to the immediately preceding state, as illustrated. The keybuttons 102a are arranged in, e.g., a 5 (rows)×3 (columns) matrix on a circuit board 112 via a sheet member 109, which may be formed of synthetic rubber or similar elastic material. Switches 111 and other various parts are mounted on the circuit board 112. Each switch 111 has a metallic contact convex upward, as viewed in FIG. 2, and a flange 102s extending outward from the edge. When the switch 111 is not pushed, the upper surface of the flange 102s abuts against a contact surface 107c, which will be described later, extending from the edge of the associated hole 107a.

The holes 107a via which the keybuttons 102a appear are formed in the casing 107 in, e.g., a 5×3 matrix in the same manner as the keybuttons 102a. The sheet member 109 disposed in the casing 107 is formed with a seal portion 109c along its edges, as will be described more specifically later. Part of the casing 107 facing the seal portion 109c is implemented as a seal region 107b configured to press the top 109p of the seal portion 109c for thereby implementing hermetic sealing. The contact surface 107c, extending from the edge of each hole 107a, contacts the flange 102a of the associated keybutton 102a when the keybutton 102a is not pressed.

The sheet member 109 includes, in addition to the seal portion 109c, a surface or one major surface 109a on which the keybuttons 102a are mounted and lugs 109b formed on the other major surface. The lugs 109b each are positioned at the center of a portion corresponding to the associated keybutton 102a and configured to press the switch 111.

In the waterproof structure 108, the top 109p of the seal portion 109c is held in close contact with the seal region 107b of the casing 107 and pressed thereby. With this configuration, the waterproof structure 108 prevents water from entering the casing 107 via clearances between the keybuttons 10a and the casing 107. The bottom of the seal portion 109c is seated on the surface of the circuit board 112.

When any one of the keybuttons 102a is pushed, the lug 109b beneath the keybutton 102a pushed is pressed against the metallic contact of the associated switch 111 and flattens the metallic contact, establishing, e.g., an ON state. When the above keybutton 102a is released, the lug 109b is restored to its original position due to the elasticity of the sheet member 109 and metallic contact. The metallic contact is also restored to its convex position, establishing, e.g., an OFF state.

When the keybutton 102a is not pressed, the top of the flange 102s of the keybutton 102a and the contact surface 107c of the hole 107a contact each other, preventing water from entering the casing 107.

Figure 5:
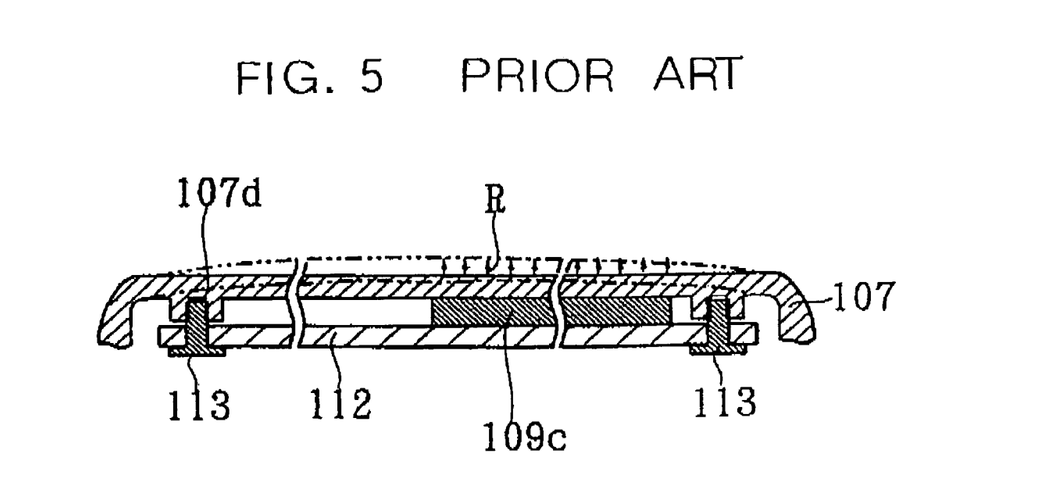
FIG. 5 is a section along line F—F of FIG. 1.

The circuit board 112 is affixed to the casing 107 by male screws or fastening means 113. As shown in FIG. 5, each male screw 113 is driven into one of female screw holes 17d formed in four corners of the inner surface of the casing 107.

Figure 3:
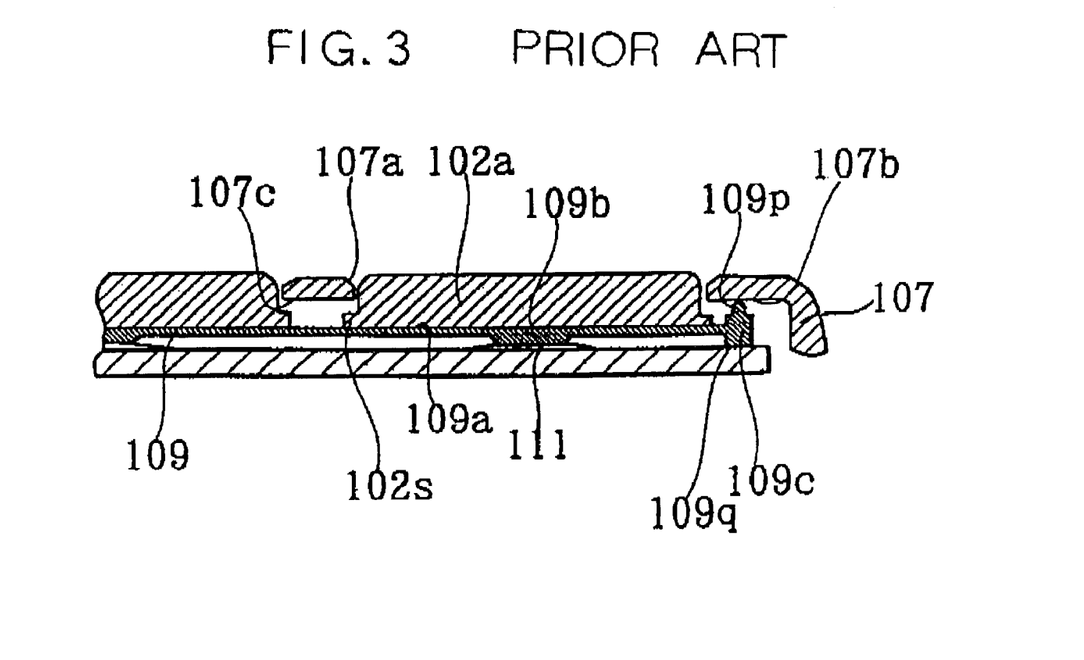
FIGS. 3 and 4 are sections demonstrating the operation of the conventional electronic apparatus.

A procedure for assembling the telephone 101 will be described hereinafter. First, as shown in FIG. 3, the sheet member 109 carrying the keybuttons 102a on its surface 109a is laid on the circuit board 112 on which the switches 111 and other parts are mounted. Subsequently, the casing 107 is mounted to the sheet member 109 such that the keybuttons 102a appear via the holes 107a. In this condition, the top 109p of the seal portion 109c does not deform, but simply contacts the seal region 107b of the casing 107.

As shown in FIG. 5, the male screws 113 are driven into the female screw holes 107d little by little with the circuit board 112 and casing 107 sandwiching the sheet member 109. As a result, as shown in FIG. 2, the top 109p of the seal portion 109c is crushed little by little by the seal region 107b or the casing 107. When the male screws 113 are fully driven into the female screw holes 107d, the top 109p of the seal portion 109c is pressed against the seal region 107b due to the elastic restoring force of the seal portion 109c.

Figure 4:
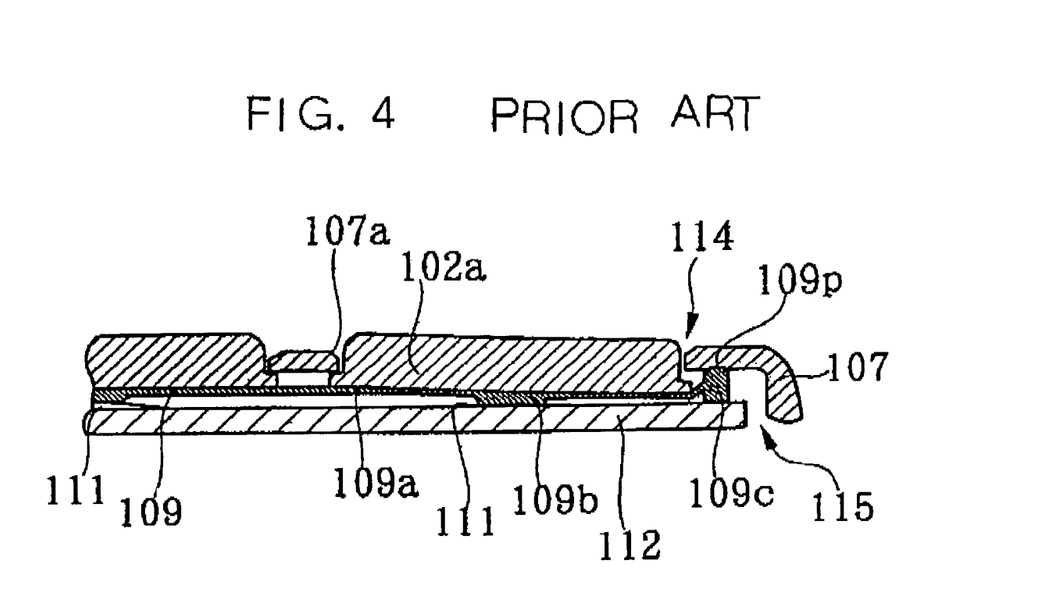

Assume that any one of the keybuttons 102a of the telephone 101 thus assembled is pushed. Then, as shown in FIG. 4, a clearance 114 appears between the keybutton 102a and the casing 107 and allows, e.g., raindrops to enter the casing 107 when the telephone 101 is used outdoor in the rain. At this instant, the seal portion 109c and the inner surface of the casing 107, contacting each other, prevent such raindrops from entering the casing 107. Further, when water, for example, enters a clearance 115 between the circuit board 112 and the casing 107, the bottom 109q of the seal portion 109c and the portion of the circuit board 112 corresponding to the seal 109c block such water.

It is to be noted that when the keybutton 102a is not pushed, the clearance 114 mentioned above does not appear because the contact surface 107C of the hole 107a and the top of the flange 102a contact each other.

As stated above, the conventional waterproof structure prevents water from entering the casing 107 and corroding circuitry arranged on the circuit board 112.

Figure 7:
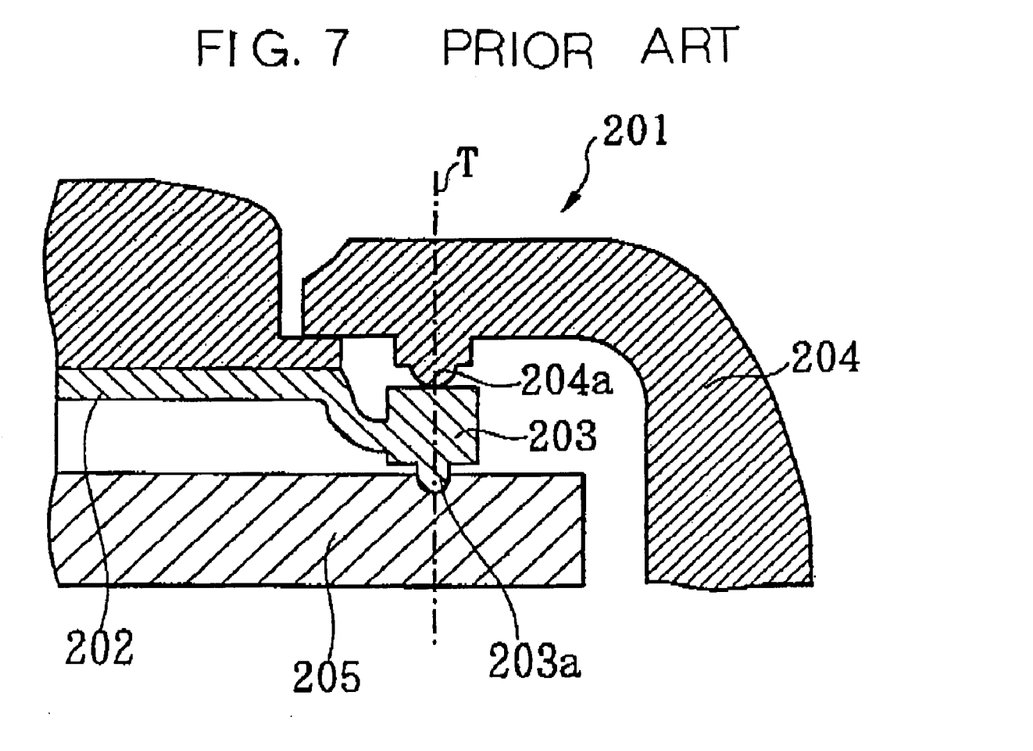
FIG. 7 is a fragmentary section showing another conventional electronic apparatus.

FIG. 7 shows a hermetically sealing structure taught in Laid-open Publication No. 2000-151772 mentioned earlier. As shown, a portable personal terminal 201 includes a sheet member 202 formed with a seal portion 203 along its substantially square edges A lug 203a protrudes from the bottom of the seal portion 203 while a lug 204a protrudes from the inner surface of a casing 204. The sheet member 202 and casing 204 are positioned on a circuit board 205 such that the center of the lug 203a and that of the lug 204a align on the same vertical line T. In this condition, the lug 204a presses the seal portion 203 with the result that the lug 203a is crushed, implementing hermetic sealing.

Figure 6:
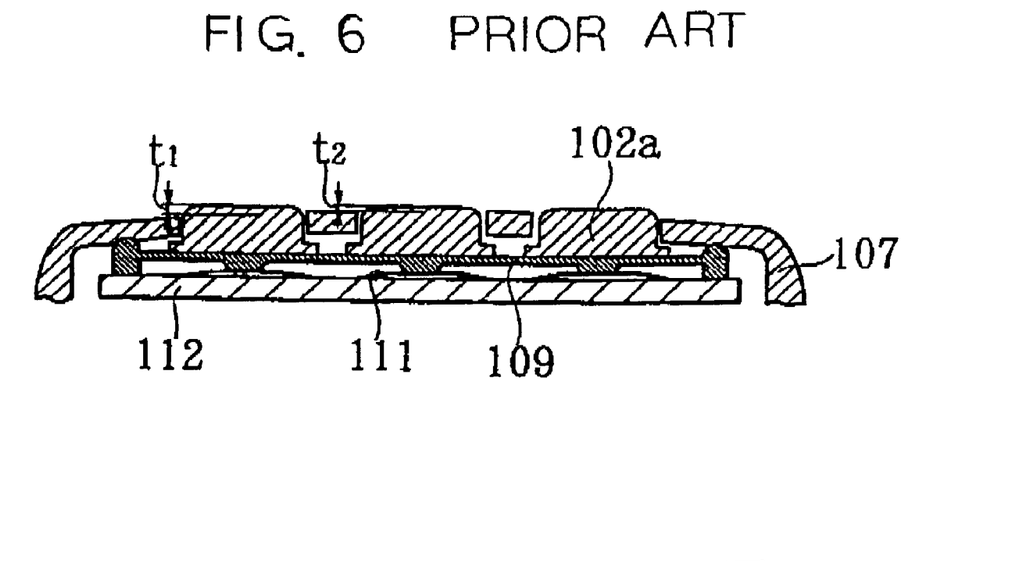
FIG. 6 is a section for describing the problems of the conventional electronic apparatus.

The conventional waterproof structures described above have the following problems left unsolved. The telephone 101, FIG. 1, has a problem that the seal portion 109c tends to restore its original position when its top 109p is crushed. The restoring or repulsive force of the seal portion 109c acts on the inner surface of the casing 107 and causes the casing 107 to deform, as indicated by a dash-and-dots line in FIG. 5. Consequently, as shown in FIG. 6 in an exaggerated view, the amount by which each keybutton 102a protrudes varies from one position to another position. More specifically, the keybutton 102a positioned in the peripheral portion protrudes by an amount t1 greater than an amount t2 by which the keybutton 102a positioned in the center portion. This not only obstructs easy manipulation of the operating section, but also degrades the appearance of the telephone 101.

Figure 8:
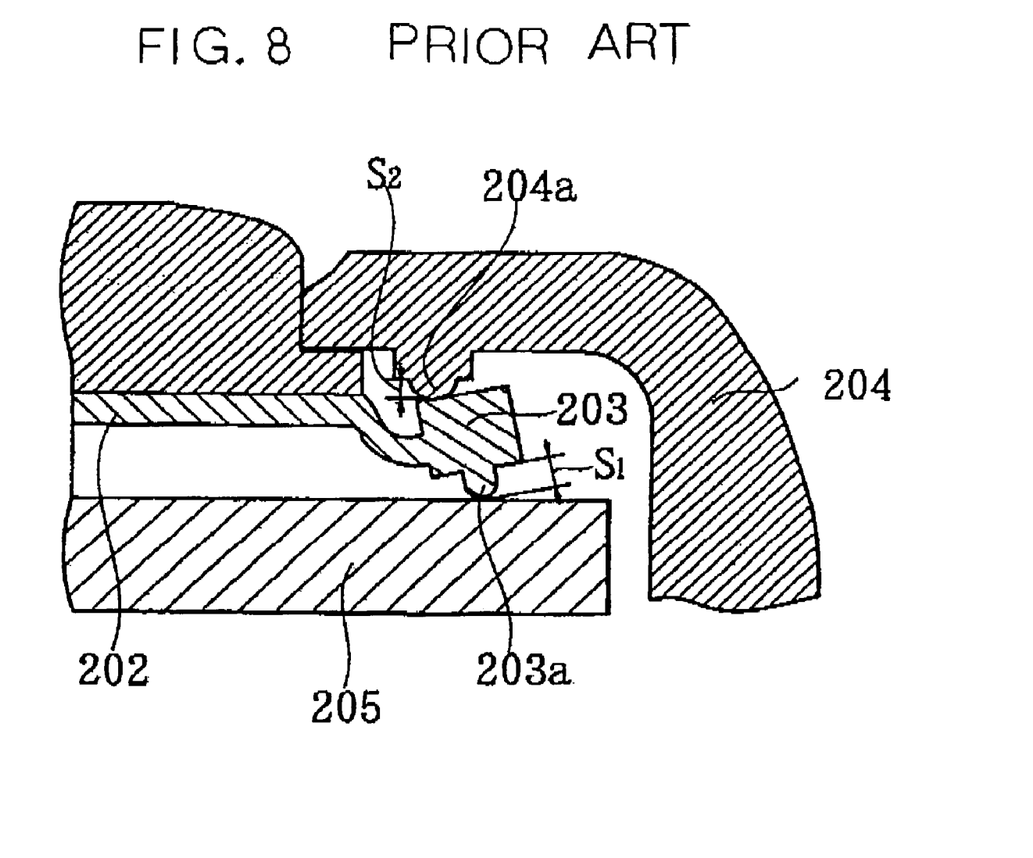
FIG. 8 is a section for describing the problems of the electronic apparatus shown in FIG. 7.

As shown in FIG. 8, in the portable terminal 201 shown in FIG. 7, the center of the lug 203a and that of the lug 204a are shifted from each other due to the dimensional tolerances of the sheet member 202 and casing 204, causing the lug 203a to rotate. As a result, the lug 203a cannot closely contact the circuit board 205. Also, the lug 203a cannot be fully crushed when the amount of projection S1 of the lug 203a or the amount of projection S2 of the projection 204a is short due to tolerance or when the circuit board 205 is shifted away from the casing 204. In this manner, the sealing structure shown in FIG. 7 is noticeably susceptible to dimensional errors and fail to realize sure waterproofing. Should the lugs 203a and 204a be increased in size and therefore in the amount of crush in order to obviate the influence of dimensional errors, the restoring or repulsive force would increase and again give rise to the above problems. Moreover, such lugs 203a and 204a cannot meet the increasing demand for a small-size portable terminal.

Referring to FIGS. 9 through 19, an electronic apparatus embodying the present invention and implemented as a portable personal telephone by way of example will be described hereinafter. As shown in FIGS. 9 through 13, the telephone, generally 1, includes an operating section 2 on which a plurality of keybuttons or operating members 2a are arranged. The telephone 1 further includes a transmission type LCD or similar display 3, an antenna 4 for radio transmission and receipt, a speaker 5 for outputting a received speech, a microphone 6 for inputting a speech to be sent, and a casing 7. The casing 7 is implemented as, e.g., a molding of synthetic resin and formed with holes 7a through which the keybuttons 2a appear. A waterproof structure 8 is configured to prevent water or similar liquid from entering the casing 7 via, e.g., clearances between the keybuttons 2a and the edges of the holes 7a.

Figure 9:
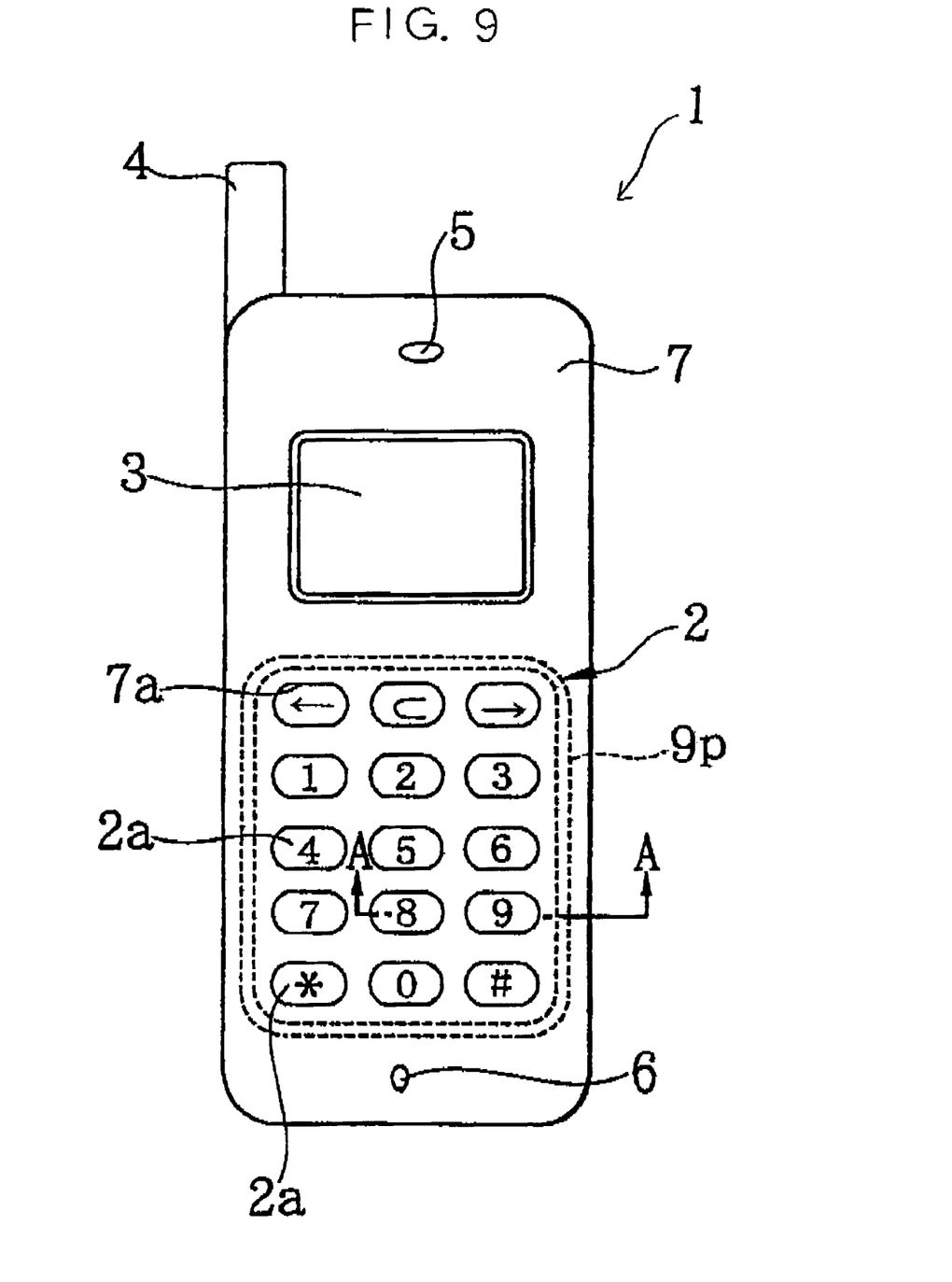
FIG. 9 is a front view showing an electronic apparatus including a waterproof structure embodying the present invention.
Figure 10:
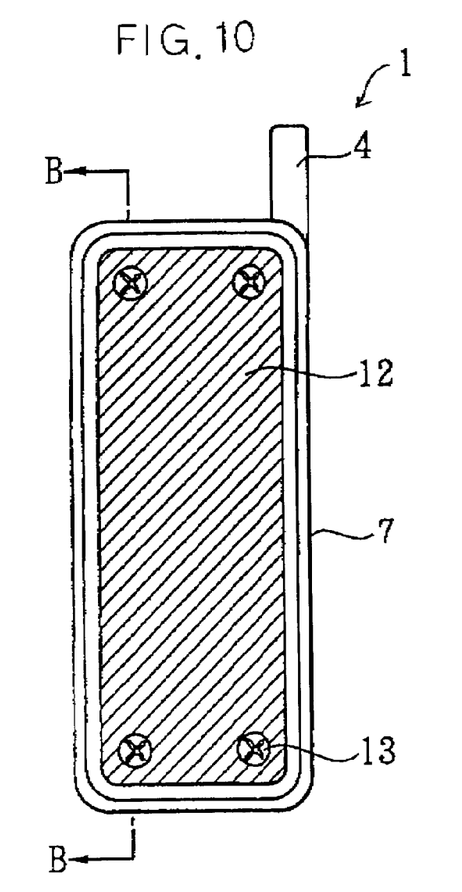
FIG. 10 is a rear view of the illustrative embodiment.
Figure 11:
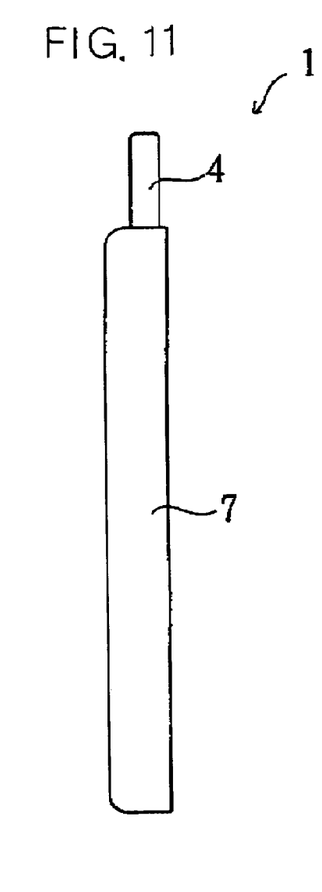
FIG. 11 is a section of the illustrative embodiment.
Figure 12:
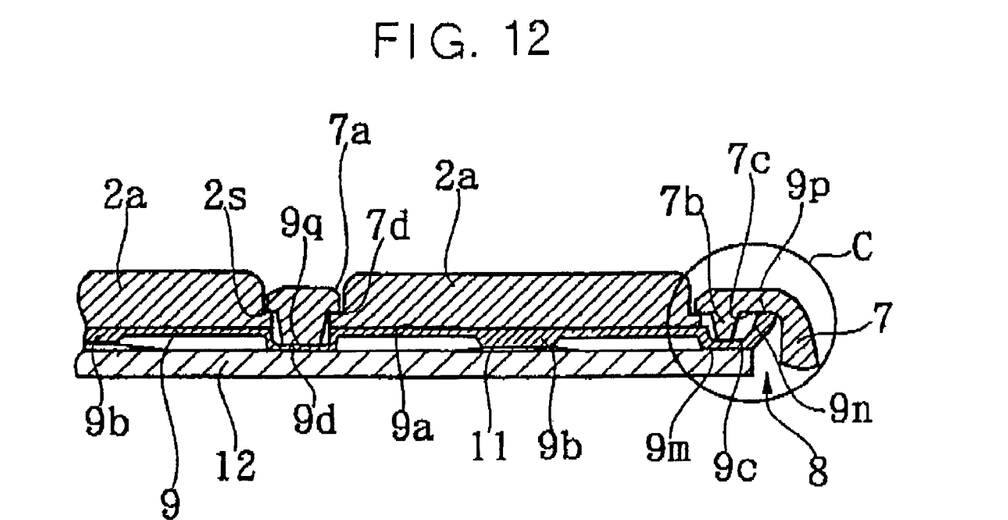
FIG. 12 is a section along line A—A of FIG. 9.

As shown in FIGS. 9, 10 and 12, the keybuttons 2a include ten-keys for inputting, e.g., numerals and a clear key that returns the operation to the immediately preceding state, as illustrated. The keybuttons 2a are arranged in, e.g., a 5×3 matrix on a circuit board 12 via a sheet member 9, which may also be formed of synthetic rubber or similar elastic material. Switches 11 and other various parts are mounted on the circuit board 12. Each switch 11 has a metallic contact convex upward and a flange 2s extending outward from the edge. When the switch 11 is not pushed, the top of the flange

2s abuts against a contact surface 7d, which will be described later, extending from the edge of the associated hole 7a.

The holes 7a via which the keybuttons 2a appear are formed in the casing 7 in, e.g., a 5×3 matrix in the same manner as the keybuttons 2a. Lugs 7b protrude from the inner surface of the casing 7 around the holes 7a so as to press a peripheral flat portion 9m and a middle flat portion 9q, which will be described specifically later. The sheet member 9 is formed with a peripheral seal portion 9c, which will also be described specifically later. Part of the inner surface of the casing 7 facing the peripheral seal portion 9c is implemented as a slide surface 7c on which the top 9p of a lug 9n also included in the sheet member 9 is smoothly slidable while remaining in close contact with the slide surface 7c. The casing 7 is formed of plastics whose coefficient of friction is small enough to allow the material of the lug 9n to smoothly slide, and may be formed by injection molding by way of example.

A contact surface 7d extends from the edge of each hole 7a and contacts the top of the flange 2s of the associated keybutton 2a when the keybutton 2a is not pressed.

Figure 13:
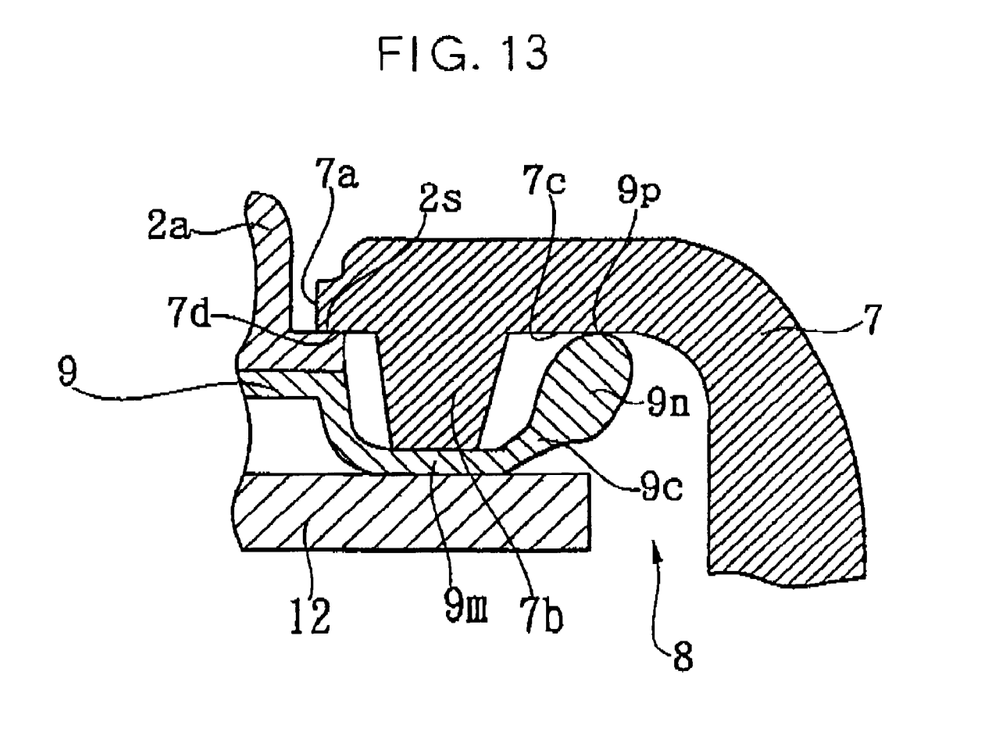
FIG. 13 is an enlarged view of a portion C included in FIG. 12.

As shown in FIGS. 12 and 13, the sheet member 9 includes a surface or one major surface 9a on which the keybuttons 2a are mounted and lugs 9b formed in the center portion of the other major surface for pressing the switches 11. A peripheral seal portion 9c extends along the edges of the sheet member 9 in such a manner as to surround the keybuttons 2a and is convex toward the reverse surface of the telephone 1. A middle bent portion 9d is positioned beneath the edge of each of the holes 7a other than those positioned in the peripheral portion and is also convex toward the reverse surface of the telephone 1.

In the peripheral seal portion 9c, the peripheral flat portion 9m contacts the surface of the circuit board 12 at its underside. The lug 9n is angularly movable about a preselected point of the peripheral flat portion 9m and has the top 9p, which has a semicircular section, slidably pressed against the slide surface 7c of the casing 7 for thereby blocking water and dust. As shown in FIG. 9, the top 9p of the lug 9n is held in close contact with the slide surface 7c along the square edges of the sheet member 9 in such a manner as to surround the keybuttons 2a.

In the peripheral seal portion 9c, the root portion of the lug 9n close to the peripheral flat portion 9m is squeezed to preselected thickness small enough to allow the seal portion 9c to easily angularly move and exert a restoring force when angularly moved. This thickness may be substantially identical with the thickness of the peripheral flat portion 9m.

The length of the lug 9n to the top Sp, i.e., the amount of interference is selected in consideration of expected dimensional errors. For example, when dimensional errors are expected to be relatively great, the lug 9n is made relatively long so as to reduce the influence of dimensional errors in the vertical direction, e.g., in the direction of height of the lug 7b. Such a configuration does not increase the restoring force or repulsive force of the lug 9n more than necessary.

The middle bent portion 9d includes the middle flat portion 9q mentioned earlier.

When any one of the keybuttons 2a is pushed, the lug 9b beneath the keybutton 2a pushed is pressed against the associated metallic contact and flattens the metallic contact, establishing, e.g., an ON state. When the above keybutton 2a is released, the lug 9b is restored to its original position due to the elasticity of the sheet member 9 and metallic contact.

The metallic contact is also restored to its convex position, establishing, e.g., an OFF state.

As shown in FIGS. 12 and 13, the waterproof structure 8 is implemented by the peripheral seal portion 9c of the sheet member 9 closely contacting the corresponding portion of the inner surface of the casing 7. More specifically, the peripheral flat portion 9m of the peripheral sheet portion 9c is pressed against the circuit board 12 while the top 9p of the lug 9n is pressed against the slide surface 7c of the casing 7. With this configuration, the waterproof structure 8 prevents water and dust from entering the casing 7 via the clearances between the keybuttons 2a or the casing and the clearances between the peripheral portion of the circuit board 12 and the casing 7.

During assembly, when the sheet member 9 is sandwiched and pressed by the casing 7 and the circuit board 12, the lug 9n angularly moves about a preselected point of the peripheral flat portion 9m. At this instant, the top 9p of the lug 9n slides on the slide surface 7c while being pressed against the slide surface 7c. After assembly, the lug 9n tends to return to its initial position with the result that the top 9p of the lug 9n remains in close contact with the slide surface 7c.

Further, at the portion of the sheet member 9 other than the peripheral portion, the middle flat portion 9q of the middle bent portion 9d is also pressed against the circuit board 12 by the lug 7b of the casing 7.

When the keybutton 2a is not pressed, the top of the flange 2s of the keybutton 2a remains in contact with the contact surface 7d of the casing 7, obviating the entry of water and dust.

Figure 14:
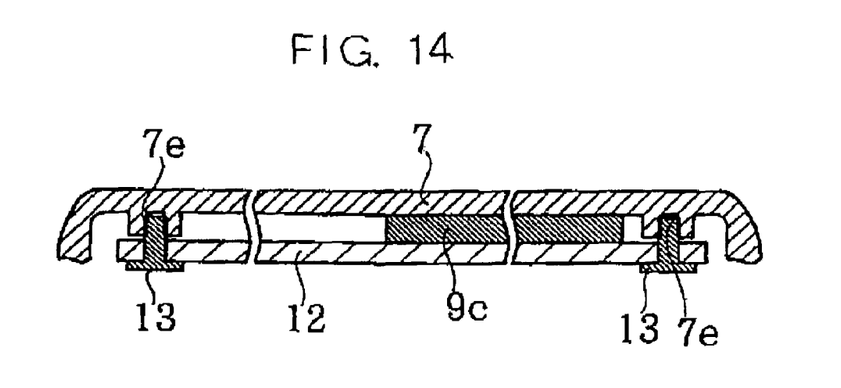
FIG. 14 is a section along line B—B of FIG. 10.

As shown in FIG. 14, the circuit board 12 is affixed to the casing 7 by male screws or fastening means 13. In the illustrative embodiment, too, each male screw 13 is driven into one of female screw holes 7e formed in four corners of the inner surface of the casing 7.

Figure 15:
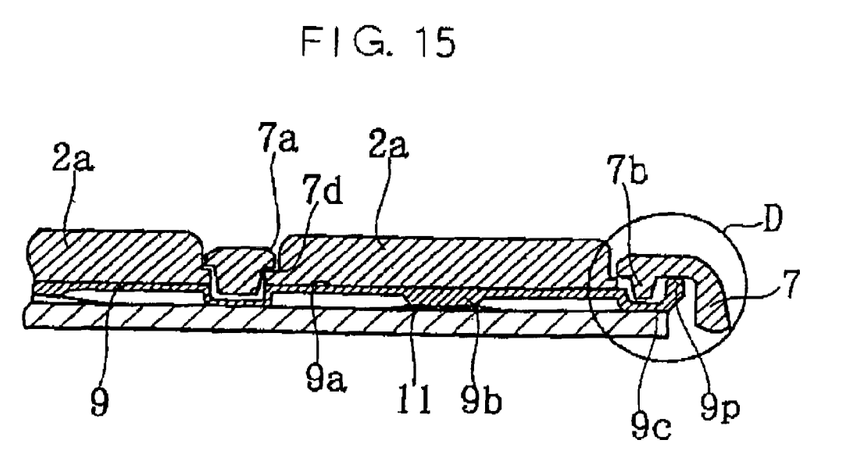
FIG. 15 is a section showing the waterproof structure of the illustrative embodiment.
Figure 16:
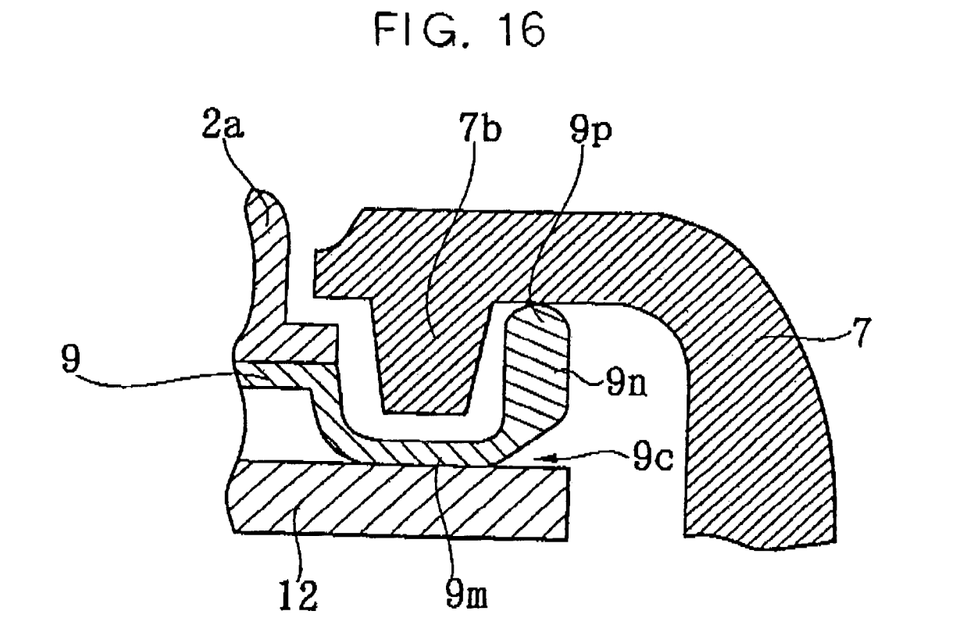
FIG. 16 is an enlarged section of a portion D included in FIG. 15.

A procedure for assembling the telephone 1 will be described hereinafter. First, as shown in FIG. 14, the sheet member 9, carrying the keybuttons 2a on its surface 9a, is laid on the circuit board 2 on which the switches 11 and other parts ire mounted with the peripheral flat portion 9m and middle flat portion 9q contacting the circuit board 2. Subsequently, the casing 7 is mounted to the sheet member 9 such that the keybuttons 2a appear via the holes 7a. At this stage of assembly, as shown in FIGS. 15 and 16, the peripheral seal portion 9 cc is positioned substantially perpendicular to the circuit board 12 with the top 9p of the lug 9n simply contacting the slide surface 7c because the lug 9n is not bent by an external force. Also, the lugs 7b of the casing 7 are spaced from the peripheral flat portion 9m and middle flat portion 9q, and so are the contact portion 7d and the top of the flange 2s.

Figure 17:
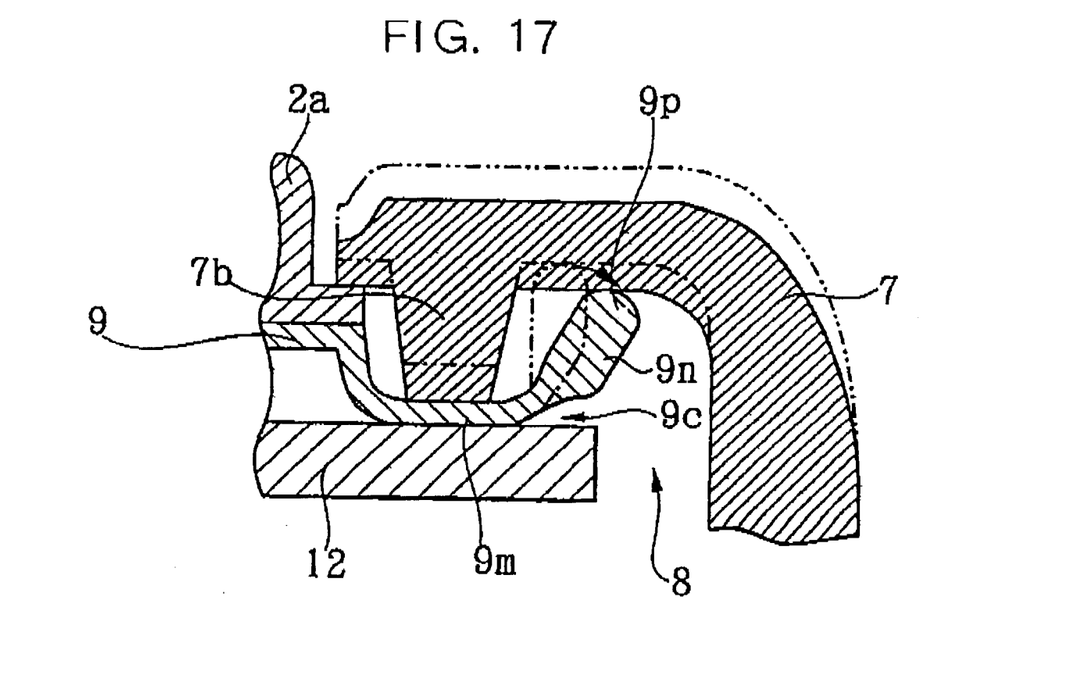
FIGS. 17 through 19 are sections demonstrating the operation of the illustrative embodiment.

Subsequently, the male screws 13 are driven into the female screw holes 7e little by little in the condition shown in FIGS. 15 and 16. As a result, as shown in FIG. 17, the lug 9n angularly moves about the preselected point of the peripheral flat portion 9m, so that the top 9p of the lug 9n slides on the slide surface 7c while being pressed against the slide surface 7c.

In the seal portion 9c, part of the lug 9n close to the peripheral flat portion 9m is formed sufficiently thin and can therefore easily angularly move even when subject to a relatively weak force. In FIG. 17, the original or unstressed position of the lug 9n is indicated by a dash-and-dots line.

When the male screws 13 are fully driven into the female screw holes 7e, the top 9p of the lug 9n is pressed against and remains in contact with the slide surface 7c due to the restoring force of the lug 9n.

Figure 18:
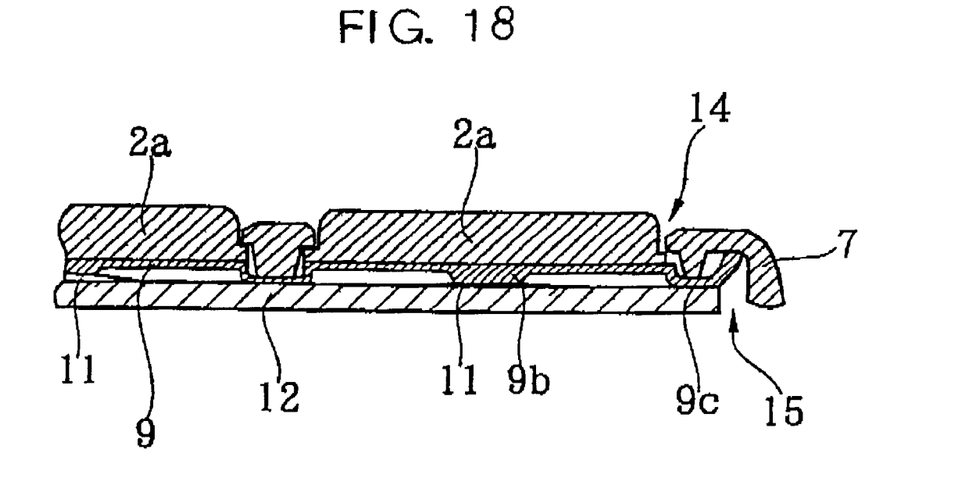

Assume that any one of the keybutton is 2a of the telephone 1 thus assembled is pushed. Then, as shown in FIG. 18, a clearance 14 appears between the keybutton 2a and the casing 7 and allows, e.g., raindrops to enter the casing 7 when the telephone 1 is used outdoor in the rain. At this instant, the seal portion 9c successfully blocks such raindrops. Further, when water, for example, enter a clearance 15 between the circuit board 12 and the casing 7, the peripheral seal portion 9c blocks it for thereby protecting the various parts and wiring arranged on the circuit board 12.

When the keybutton 2a is not pushed, the clearance 14 mentioned above does not appear because the contact surface 7d of the hole 7a and the top of the flange 2s contact each other.

Figure 19:
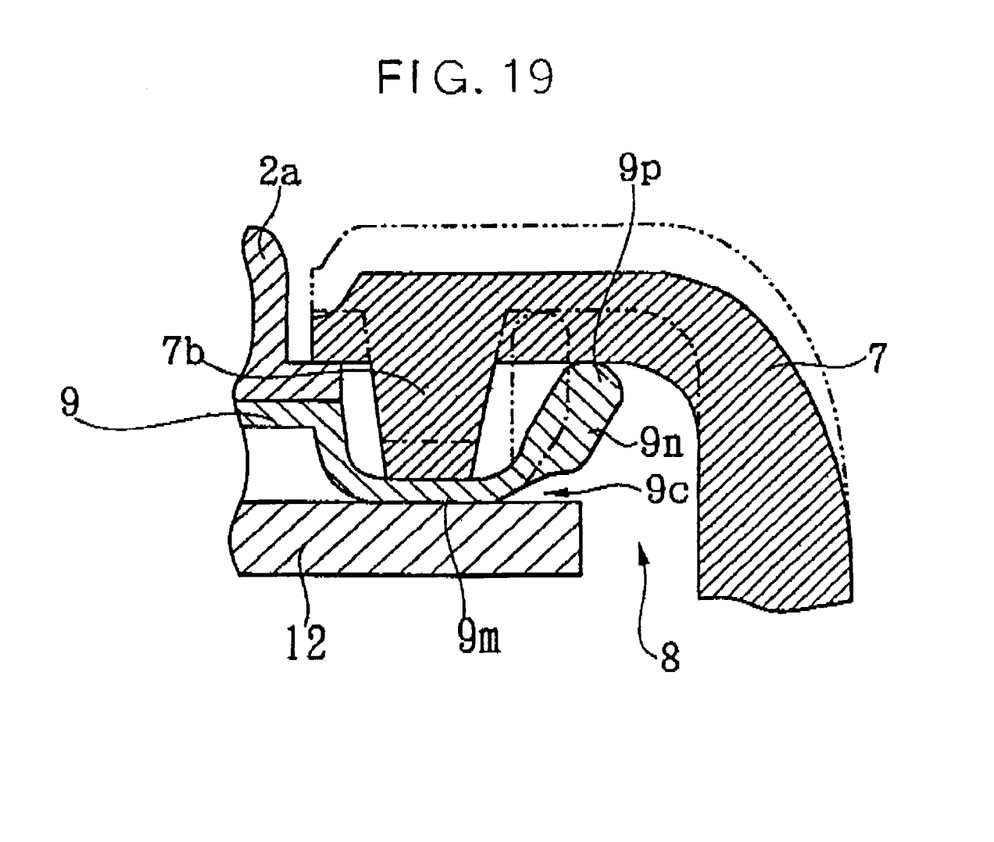

As shown in FIG. 19, when dimensional errors are estimated to be relatively great, the length of the lug 9n to the top 9p is increased in order to absorb the influence of an error in the vertical direction, e.g., the error of the lug 7b in the vertical direction. This can be done without increasing the repulsive force of the lug 9n.

In the illustrative embodiment, the lug 9n is not compressed, but simply bends with its top 9p being pressed against the slide surface of the casing 7. This prevents the casing 7 from deforming due to the strong restoring force ascribable to compression as described in relation to the conventional structure. Further, the restoring force of the lug 9n allows the top 9p to surely remain in contact with the casing, obviating a clearance.

The casing 7 is formed of plastics that allows the sheet member 9 to smoothly slide thereon. This, coupled with the fact that the semicircular top 9p of the lug 9n smoothly slides on the slide surface 7c, insures the close contact of the top 9p with the casing 7.

An alternative embodiment of the present invention will be described with reference to FIG. 20. This embodiment is identical with the previous embodiment except that the lug of the peripheral seal portion contacts the inner surface of the side wall of the casing. Structural elements identical with those of the previous embodiment are designated by identical reference numerals and will not be described specifically in order to avoid redundancy.

Figure 20:
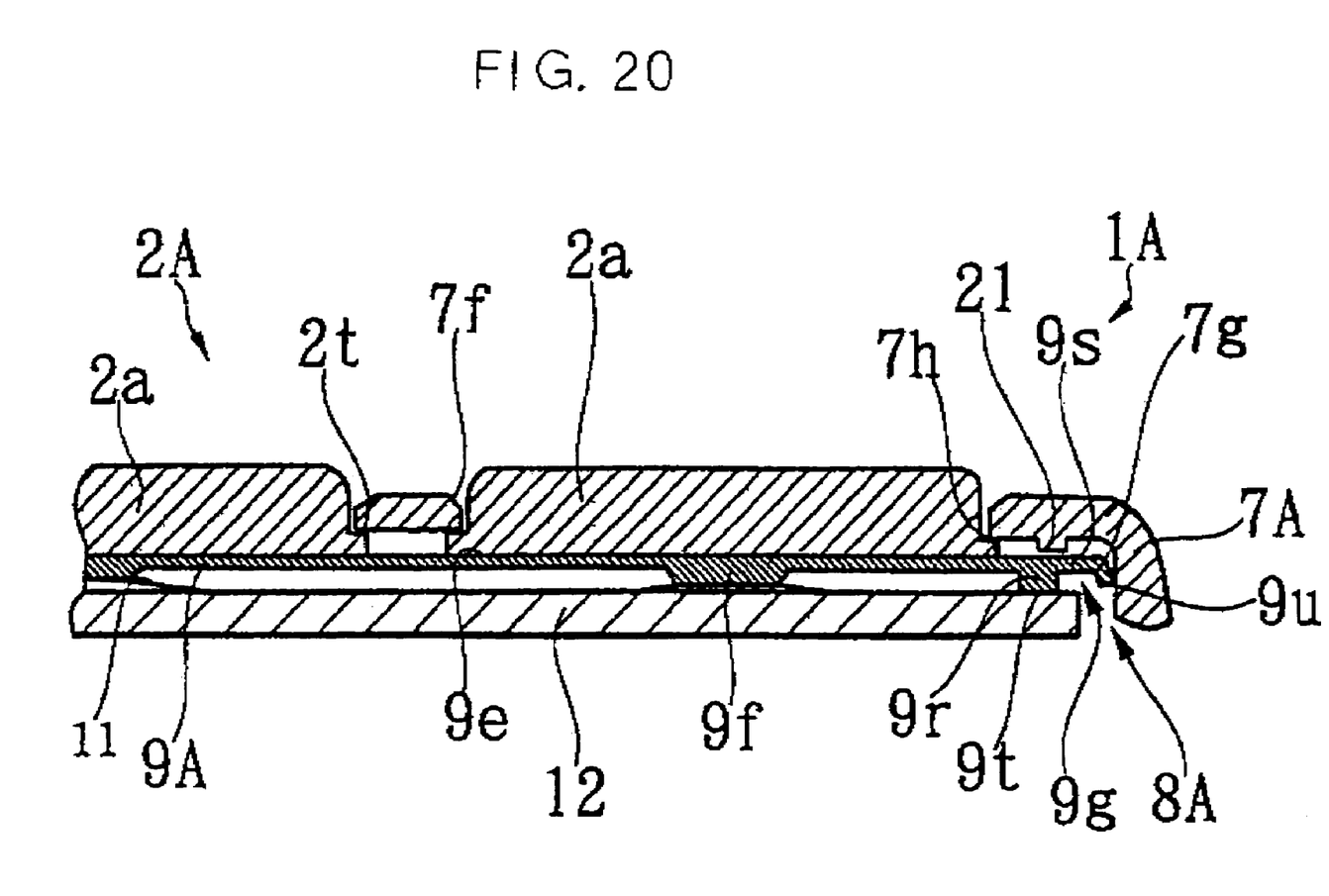
FIG. 20 is a section showing an alternative embodiment of the present invention.

As shown in FIG. 20, a portable personal telephone, generally 1A, includes an operating section 2A including a sheet member 9A and a circuit board 12 on which various parts including switches 11 are mounted. The switches 11 include an upwardly convex metallic contact each. A plurality of keybuttons 2a are arranged on the substrate 12 with the intermediary of a sheet member 9A formed of an elastic material. A flange 2t extends outward from the edge of each keybutton 2a. A casing 7A is formed with holes 7f through which the tops of the keybuttons 2a are exposed to the outside. When any one of the keybuttons 2a is not pressed, the flange 2t of the keybutton 2a contacts a contact surface 7h positioned at the edge of the hole 7f corresponding to the keybutton 2a.

A projection 9s protrudes from the edges of the sheet member 9A and faces a slide surface 7g included in the inner surface of the side wall of the casing 7, e.g., a surface perpendicular to the surface of the circuit board 12. The slide surface 7g is configured such that the end 9u of the projection 9s can smoothly slide on the slide surface 7q while remaining in close contact therewith.

The sheet member 9A includes one major surface 9e on which the keybuttons 2a are mounted, lugs 9f each being positioned on the other major surface at the center of a portion aligning with one of the keybuttons 2a, and a peripheral seal portion 9g positioned at the edge of the seat member 9A and including the projection 9s. The peripheral seal portion 9g includes a base portion 9r whose bottom 9t contacts the circuit board 12 in addition to the projection 9g. The projection 9s protrudes from the base portion 9r with its end 9u being pressed against the slide surface 7g of the casing 7A in a bent position.

When any one of the keybuttons 2a is pushed, the lug 9f of the sheet member 9 positioned beneath the keybutton 2a pushed is pressed against the metallic contact of the switch 11, making the contact flat to thereby establish, e.g., an ON state. When the keybutton 2a is released, the lug 9f is returned to its initial position due to the restoring force of the Sheet member 9A and that of the metallic contact. At the same time, the metallic contact restores its convex position to thereby establish, e.g., an OFF state.

A waterproof structure GA particular to the illustrative embodiment is implemented by the end 9u of the peripheral seal portion 9g included in the sheet member 9 and the slide surface 7g of the casing 7A closing contacting each other. With this configuration, the waterproof structure BA prevents water and dust from entering the casing 7A via clearances between the keybuttons 2a and the casing 7A. Further, the bottom 9t of the base portion 9r, contacting the circuit board 12, prevents water and dust from entering the casing 7A via clearances between the circuit board 12 and the casing 7A.

During assembly, when the sheet member 9A is sandwiched and pressed between the casing 7A and the circuit board 12, the end 9u of the projection 9s is pressed against the slide surface 7g with the result that the projection 9s bends with the end 9u sliding on the slide surface 7g. After the assembly, the end 9u of the projection 9s remains in close contact with the slide surface 7g due to the restoring force of the projection 9s, as will be described more specifically later.

When the keybutton 2a is not pressed, the top of he flange 2t of the keybutton 2a contacts the contact surface 7h formed at the edge of the corresponding hole 7f of the casing 7, thereby preventing water and dust from entering the casing 7A.

The circuit board 12 is affixed to the casing 2A by male screws or fastening means driven into female screw holes formed at the four corners of the reverse surface of the casing 2A.

To assemble the portable personal telephone 1A, first the sheet member 9A loaded with the keybuttons 2a on its surface 9e is laid on the circuit board 12 on which the switches 11 with the metallic contacts and other parts are mounted. At this instant, the bottom 9t of the base portion 9r included in the sheet member 9A rests on the circuit board 12. Next, the casing 7A is laid on the sheet member 9A such that the keybuttons 2a each are exposed to the outside via one of the holes 7f.

Subsequently, the male screws are driven into the female screw holes little by little with the result that the projection 9s bends with its end 9u being pressed against and sliding on the slide surface 7g. After the male screws have been fully driven into the female screw holes, the end 9u of the projection 9s remains in close contact with the slide surface 7g because of the restoring or repulsive force of the projection 9s.

Assume that any one of the keybuttons 2a of the telephone 1A thus assembled is pushed. Then, a clearance appears between the keybutton 2a and the casing 7A and allows, e.g., raindrops to enter the casing 7A when the telephone 1A is used outdoor in the rain. At this instant, the end 9u of the projection 9s and the slide surface 7g of the casing 7A, closely contacting each other, obstruct such raindrops. Further, when water, for example, enters a clearance between the circuit board 12 and the casing 7A, the bottom 9t of the base portion 9r and the portion of the circuit board 2 corresponding to the base portion 9r obstruct such water.

It is to be noted that when the keybutton 2a is not pushed, the clearance mentioned above does not appear because the contact surface 7h of the hole 7f and the upper surface of the flange 2t contact each other.

If desired, the length of the projection 9s to the end 9u and therefore the amount of interference may be varied in order to absorb dimensional errors.

The illustrative embodiment achieves the same advantages as the previous embodiment. Another advantage achievable with the illustrative embodiment is that even when lugs 21, corresponding to ejector pin marks or the gates of a mold are left on the inner surface of the casing 7A due to resin molding, hermetic sealing can be surely established by avoiding the lugs 21.

While the illustrative embodiments have concentrated on a portable personal telephone, the present invention is, of course, applicable to any other portable electronic apparatus, e.g., a PHS (Personal Handyphone System) terminal, a PDA (Portable Data Terminal) or a digital camera or even to, e.g., a keyboard associated with a personal computer. The keybuttons or key switches shown and described may be replaced with slidable operating members, if desired. Further, the sheet with the keybuttons may be replaced with a single key sheet. In addition, the lug 7b may not be positioned at the edge of the hole 7a, but may be positioned above the peripheral flat portion 9m for thereby further promoting sure waterproofing.

In summary, it will be seen that the present invention provides an electronic apparatus with a unique waterproof structure having various unprecedented advantages, as enumerated below.

(1) A seal portion is simply deformed by a bending load while being at least partly pressed against the inner surface of a casing, so that the volume of the seal portion varies little, i.e., the seal portion is not compressed. Therefore, a strong restoring force that would cause the casing deform does not occur in the seal portion. Further, at least part of the seal portion surely remains in contact with the inner surface of the casing due to a restoring force while being subject to the bending load. This obviates a clearance that would allow water and dust to reach a circuit board disposed in the casing.

(2) The length of the seal portion and therefor the amount of interference is variable in accordance with estimated dimensional errors for thereby absorbing the dimensional errors. Therefore, the end of the seal portion, for example, can surely remain in close contact with the inner surface of the casing, further promoting hermetic sealing.

(3) When the casing is formed of a material on which the material of a sheet member can smoothly slide, the end of the seal portion, for example, can further surely contact the inner surface of the casing.

(4) When the root portion of the seal portion is formed relatively thin, the seal portion can easily deform when subjected even to a relatively weak force.

Various modifications will become possible for those skilled in the art after receiving the teachings of the present disclosure without departing from the scope thereof.

What is claimed is:

1. A waterproof structure for an electronic apparatus comprising:

an operating member positioned such that an end of said operating member appears via a hole formed in a casing of said electronic apparatus;

a circuit board loaded with a switch configured to selectively open or close when said operating member is operated; and a sheet member formed of an elastic material and intervening between said operating member and said circuit board;

said sheet member comprising, at least in a peripheral portion thereof, a seal portion configured to prevent a liquid from entering said electronic apparatus and reaching a surface of said circuit board;

wherein when said sheet member is pressed between said casing and said circuit board, said seal portion is at least partly pressed against an inside surface of said casing while being subject to a bending load.

2. The structure as claimed in claim 1, wherein said operating member comprises a keybutton configured to cause the switch to selectively open or close said switch when pressed.

3. The structure as claimed in claim 1, wherein when said sheet member is pressed between said casing and said circuit board, said seal portion bends and remains in a bent position with an end of said seal portion being pressed against the inside surface of said casing.

4. The structure as claimed in claim 3, wherein when said sheet member is pressed between said casing and said circuit board, said seal portion bends with the end thereof sliding on the inside surface of said casing and is held in a position in which said seal portion exerts a restoring force.

5. The structure as claimed in claim 3, wherein a root portion of said seal portion is reduced in thickness.

6. The structure as claimed in claim 5, wherein a thickness of the root portion is selected in accordance with a force necessary for causing said seal portion to bend and the restoring force for hermetic sealing.

7. The structure as claimed in claim 3, wherein the end of said seal portion has a semicircular section.

8. The structure as claimed in claim 3, wherein the inside surface of said casing is formed of a material having a relatively small coefficient friction relative to a material that forms at least the end of said seal portion.

9. The structure as claimed in claim 3, wherein a length of said seal portion is selected in accordance with an estimated dimensional error of at least one of said circuit board and said sheet member.

10. The structure as claimed in claim 3, wherein said operating member comprises a plurality of operating members arranged in a preselected pattern, said seal portion is configured to surround an area where said plurality of operating members are arranged, said seal portion contacts the inside surface of said casing and includes a continuous seal region, which prevents the liquid from entering said electronic apparatus and reaching said circuit board, surrounding said area.

11. The structure as claimed in claim 3, wherein said operating member is positioned on said sheet member.

12. The structure as claimed in claim 3, wherein said operating member and said sheet member are formed of an elastic material integrally with each other.

13. In an electronic apparatus provided with a waterproof structure, said waterproof structure comprising:

an operating member positioned such that an end of said operating member appears via a hole formed in a casing of said electronic apparatus;

a circuit board loaded with a switch configured to selectively open or close when said operating member is operated; and sheet member formed of an elastic material and intervening between said operating member and said circuit board;

said sheet member comprising, at least in a peripheral portion thereof, a seal portion configured to prevent a liquid from entering said electronic apparatus and reaching a surface of said circuit board;

wherein when said sheet member is pressed between said casing and said circuit board, said seal portion is at least partly pressed against an inside surface of said casing while being subject to a bending load.

14. The structure as claimed in claim 13, wherein said operating member comprises a keybutton configured to cause the switch to selectively open or close said switch when pressed.

15. The structure as claimed in claim 13, wherein when said sheet member is pressed between said casing and said circuit board, said seal portion bends and remains in a bent position with an end of said seal portion being pressed against the inside surface of said casing.

16. The structure as claimed in claim 15, wherein when said sheet member is pressed between said casing and said circuit board, said seal portion bends with the end thereof sliding on the inside surface of said casing and is held in a position in which said seal portion exerts a restoring force.

17. The structure as claimed in claim 15, wherein a root portion of said seal portion is reduced in thickness.

18. The structure as claimed in claim 17, wherein a thickness of the root portion is selected in accordance with a force necessary for causing said seal portion to bend and the restoring force for hermetic sealing.

19. The structure as claimed in claim 15, wherein the end of said seal portion has a semicircular section.

20. The structure as claimed in claim 15, wherein the inside surface of said casing is formed of a material having a relatively small coefficient friction relative to a material that forms at least the end of said seal portion.

21. The structure as claimed in claim 15, wherein a length of said seal portion is selected in accordance with an estimated dimensional error of at least one of said circuit board and said sheet member.

22. The structure as claimed in claim 15, wherein said operating member comprises a plurality of operating members arranged in a preselected pattern, said seal portion is configured to surround an area where said plurality of operating members are arranged, said seal portion contacts the inside surface of said casing and includes a continuous seal region, which prevents the liquid from entering said electronic apparatus and reaching said circuit board, surrounding said area.

23. The structure as claimed in claim 15, wherein said operating member is positioned on said sheet member.

24. The structure as claimed in claim 15, wherein said operating member and said sheet member are formed of an elastic material integrally with each other.

\* \* \* \* \*